US009977811B2

(12) United States Patent
Mantri et al.

(10) Patent No.: US 9,977,811 B2
(45) Date of Patent: May 22, 2018

(54) PRESENTING AVAILABILITY STATUSES OF SYNCHRONIZED OBJECTS

(71) Applicant: Microsoft Technology Licensing, LLC, Redmond, WA (US)

(72) Inventors: Siddharth Mantri, Seattle, WA (US); Rachel Karin Popkin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/384,606

(22) Filed: Dec. 20, 2016

(65) Prior Publication Data
US 2017/0169066 A1 Jun. 15, 2017

Related U.S. Application Data

(63) Continuation of application No. 12/894,679, filed on Sep. 30, 2010, now Pat. No. 9,560,130.

(51) Int. Cl.
G06F 17/30 (2006.01)
H04L 29/08 (2006.01)

(52) U.S. Cl.
CPC .. *G06F 17/30362* (2013.01); *G06F 17/30174* (2013.01); *G06F 17/30356* (2013.01);
(Continued)

(58) Field of Classification Search
CPC ........... H04L 67/1095; G06F 17/30174; G06F 17/30575; H04M 3/42178; H04M 1/72525
See application file for complete search history.

(56) References Cited

U.S. PATENT DOCUMENTS

| 5,535,389 | A | 7/1996 | Elder et al. |
| 5,757,669 | A | 5/1998 | Christie et al. |
| 5,787,262 | A | * 7/1998 | Shakib ...................... G06F 9/52 707/999.008 |
| 5,864,843 | A | 1/1999 | Carina et al. |
| 5,913,213 | A | 6/1999 | Wikstrom et al. |
| 5,920,725 | A | 7/1999 | Ma et al. |
| 6,061,683 | A | 5/2000 | Alonso |
| 6,173,290 | B1 | 1/2001 | Goldberg |
| 6,460,051 | B1 | 10/2002 | LaRue et al. |

(Continued)

FOREIGN PATENT DOCUMENTS

| CN | 1852105 A | 10/2006 |
| CN | 101517569 A | 8/2009 |

OTHER PUBLICATIONS

"Coda File System", Retrieved From <<http://www.coda.cs.cmu.edu/trac/wiki/CodaHOWTO/TroubleShooting>>, Apr. 28, 2007, 7 Pages.

(Continued)

Primary Examiner — Joe Chacko
(74) Attorney, Agent, or Firm — Liang IP, PLLC

(57) ABSTRACT

The objects of an on object set may be synchronized across many clients (e.g., various devices may synchronize files of a mirrored filesystem). However, the synchronization of an object may be complicated, and an object may not yet be synchronized in the object set of a client for many reasons, such as an incomplete reception of the object, an unavailability of the object from currently reachable hosts, and a versioning conflict with a different version of the same object in the object set. In order to inform a user of the availability of an object in the object set, an analysis of the availability status of the object may be performed (e.g., by tracking metadata stored in object descriptors of respective objects of the object set, and later examining the metadata of respective objects), and a selected availability status may be presented to the user.

20 Claims, 8 Drawing Sheets

(52) U.S. Cl.
CPC .. *G06F 17/30371* (2013.01); *G06F 17/30575* (2013.01); *H04L 67/1095* (2013.01)

(56) References Cited

U.S. PATENT DOCUMENTS

| | | | |
|---|---|---|---|
| 6,505,212 B2 | 1/2003 | Nakano et al. | |
| 6,658,485 B1 | 12/2003 | Baber et al. | |
| 6,792,454 B2 | 9/2004 | Nakano et al. | |
| 6,928,467 B2 | 8/2005 | Peng | |
| 7,342,555 B2 | 3/2008 | Starbuck et al. | |
| 7,606,881 B2 | 10/2009 | Chasman et al. | |
| 7,610,317 B2 | 10/2009 | Rao et al. | |
| 7,660,888 B2 | 2/2010 | Smyth et al. | |
| 7,779,130 B1 | 8/2010 | Toutonghi | |
| 8,166,101 B2 | 4/2012 | Shah | |
| 8,370,754 B2 | 2/2013 | Bull et al. | |
| 8,630,977 B2 | 1/2014 | Fang | |
| 8,650,498 B1 | 2/2014 | Mihovilovic | |
| 8,875,117 B2 | 10/2014 | Gates et al. | |
| 2002/0010807 A1 | 1/2002 | Multer et al. | |
| 2002/0059299 A1 | 5/2002 | Spaey | |
| 2002/0143997 A1 | 10/2002 | Huang et al. | |
| 2002/0194181 A1 | 12/2002 | Wachtel | |
| 2003/0217092 A1 | 11/2003 | Veselov | |
| 2004/0122871 A1 | 6/2004 | Hansen et al. | |
| 2004/0168174 A1 | 8/2004 | Baker | |
| 2004/0225682 A1 | 11/2004 | Murman et al. | |
| 2005/0066352 A1 | 3/2005 | Herley | |
| 2005/0138375 A1 | 6/2005 | Sadjadi | |
| 2005/0262244 A1 | 11/2005 | Smyth et al. | |
| 2006/0041893 A1 | 2/2006 | Castro et al. | |
| 2006/0230349 A1 | 10/2006 | Novak et al. | |
| 2007/0143374 A1 | 6/2007 | D'Souza et al. | |
| 2007/0208837 A1 | 9/2007 | Tian et al. | |
| 2007/0294405 A1 | 12/2007 | Mohindra et al. | |
| 2008/0005350 A1 | 1/2008 | Logvinov | |
| 2008/0059656 A1 | 3/2008 | Saliba et al. | |
| 2008/0263470 A1 | 10/2008 | Murman et al. | |
| 2009/0222494 A1* | 9/2009 | Pizlo | G06F 12/0269 |
| 2009/0300071 A1* | 12/2009 | Arcese | G06F 17/30174 |
| 2011/0106880 A1 | 5/2011 | Strong et al. | |

OTHER PUBLICATIONS

"Introduction to Microsoft Sync Framework File Synchronization Provider", Retrieved From << https://msdn.microsoft.com/en-us/library/mt763483.aspx >>, Oct. 2009, 10 Pages.

"SmartSync Pro", Retrieved From <<http://www.smartsync.com/smartsyncpro/>>, Feb. 4, 2007, 1 Page.

"Sync Logic—File and Folder Synchronization Made Easy", Retrieved From <<https://web.archive.org/web/20100822042607/http://www.ipworx.com/product/sync/index.shtml>, Mar. 10, 2008, 3 Pages.

"Supplementary Search Report Issued in European Patent Application No. 11832929.1", dated Mar. 17, 2016, 8 Pages.

"Final Office Action Issued in U.S. Appl. No. 12/894,679", dated Dec. 4, 2014, 20 Pages.

"Final Office Action Issued in U.S. Appl. No. 12/894,679", dated Jun. 17, 2016, 26 Pages.

"Non-Final Office Action Issued in U.S. Appl. No. 12/894,679", dated Oct. 6, 2015, 24 Pages.

"Non-Final Office Action Issued in U.S. Appl. No. 12/894,679", dated Dec. 24, 2012, 23 Pages.

"Non-Final Office Action Issued in U.S. Appl. No. 12/894,679", dated Mar. 17, 2014, 18 Pages.

"Notice of Allowance Issued in U.S. Appl. No. 12/894,679", dated Oct. 3, 2016, 8 Pages.

"First Office Action and Search Report Issued in Chinese Patent Application No. 201110291988.8", dated Nov. 26, 2011, 7 Pages.

"Fourth Office Action Issued in Chinese Patent Application No. 201110291988.8", dated Feb. 5, 2016, 5 Pages.

"Notice of Allowance Issued in Chinese Patent Application No. 201110291988.8", dated Jun. 27, 2016, 4 Pages.

"Reply Filed in Chinese Patent Application No. 201110291988.8", Filed Date: Feb. 14, 2014, 6 Pages.

"Reply Filed in Chinese Patent Application No. 201110291988.8", dated Aug. 26, 2014, 6 Pages.

"Reply Filed in Chinese Patent Application No. 201110291988.8", Filed Date: Oct. 6, 2015, 6 Pages.

"Reply Filed in Chinese Patent Application No. 201110291988.8", Filed Date: Mar. 16, 2016, 1 Page.

"Second Office Action Issued in Chinese Patent Application No. 201110291988.8", dated Jun. 17, 2014, 6 Pages.

"Third Office Action Issued in Chinese Patent Application No. 201110291988.8", dated Dec. 29, 2014, 6 Pages.

Kim, Steven, "Java Web Start", Retrieved From <<http://ibm.com/developerworks/java/library/j-webstar>>, Sep. 1, 2001, 14 Pages.

"International Preliminary Report Issued in PCT Application No. PCT/US2011/051146", dated Apr. 2, 2013, 5 Pages.

"International Search Report & Written Opinion Issued in PCT Application No. PCT/US2011/051146", dated May 24, 2012, 9 Pages.

Rasch, et al., "In-Place Rsync: File Synchronization for Mobile and Wireless Devices", In Proceedings of USENIX Annual Technical Conference, Jun. 2003, 10 Pages.

* cited by examiner

PRESENTING AVAILABILITY STATUSES OF SYNCHRONIZED OBJECTS

CROSS-REFERENCE TO RELATED APPLICATION(S)

This application is a continuation of and claims priority to U.S. patent application Ser. No. 12/894,679, filed on Sep. 30, 2010, the disclosure of which is incorporated herein in its entirety.

BACKGROUND

Within the field of computing, many scenarios involve a synchronization of objects in an object set, such as files in a filesystem, records in a database, or email messages in an email mailbox. Synchronization may be utilized, e.g., to promote uniformity among multiple copies of the object set, such as filesystems on multiple devices storing a mirrored set of files or records in a redundantly deployed database. Some such object sets may be centrally managed among a set of distributed clients, such as a set of devices comprising a mesh that is managed by a mesh host that stores a canonical descriptor of the object set (e.g., a master copy of a data structure identifying the objects in the object set and the locations thereof), that directs the synchronization of objects among the clients (e.g., when a first client creates a new object in the object set, the mesh host may notify other clients storing the portion of the object set of the existence of the new object, and may facilitate the transmission of the object from the first client to the other clients), and/or that mediates versioning conflicts (e.g., by evaluating multiple versions of an object to determine priority and select an authoritative version of the object).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Within scenarios involving a synchronized object set, the synchronization of a particular object may be a comparatively complex process. For example, an object may not yet exist in a synchronized state for many reasons. For example, the object may be in the process of being received from a remote device; may have been fully received but may be awaiting the completion of a processing task, such as an integrity check, a virus scan, or a release of a lock on a prior version of the object; or may have encountered a versioning conflict with a different version of the object already existing in the object set. This complexity may be frustrating for a user, who may be unable to determine why a particular object does not exist in a synchronized state on a particular client. For example, a file may exist in a filesystem of a first device, but may not exist in the filesystem of a second device mirroring the filesystem because it may be in transmission; because the second device cannot contact the first device; or because a lock or versioning conflict is obstructing the relocation of a fully received version of the file to the proper location in the filesystem of the second device.

Presented herein are techniques for promoting the presentation to a user of the status of an object in an object set that is synchronized among two or more clients (such as synchronization services operating on two or more devices connected via a network). These techniques involve an analysis of the status of an object in view of a range of possible synchronization states. When a user requests information about synchronization state of an object, the client may evaluate the object to determine its state, and may present to the user an informative availability status, such as an available status, a searching status, a receiving status, a relocating status, and a lost status. In some embodiments, this evaluation may be facilitated through the tracking of metadata for respective objects in the object set, such as the storage of availability status information in an object descriptor representing an object. The availability status may be updated in response to various events (e.g., identifying and contacting one or more clients hosting an object; receiving a portion of the object from a host; receiving the final portion that completes the object; and moving the object to a canonical position in the object set), and this metadata may be utilized to identify and inform the user of the reason for the synchronization state of the object.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
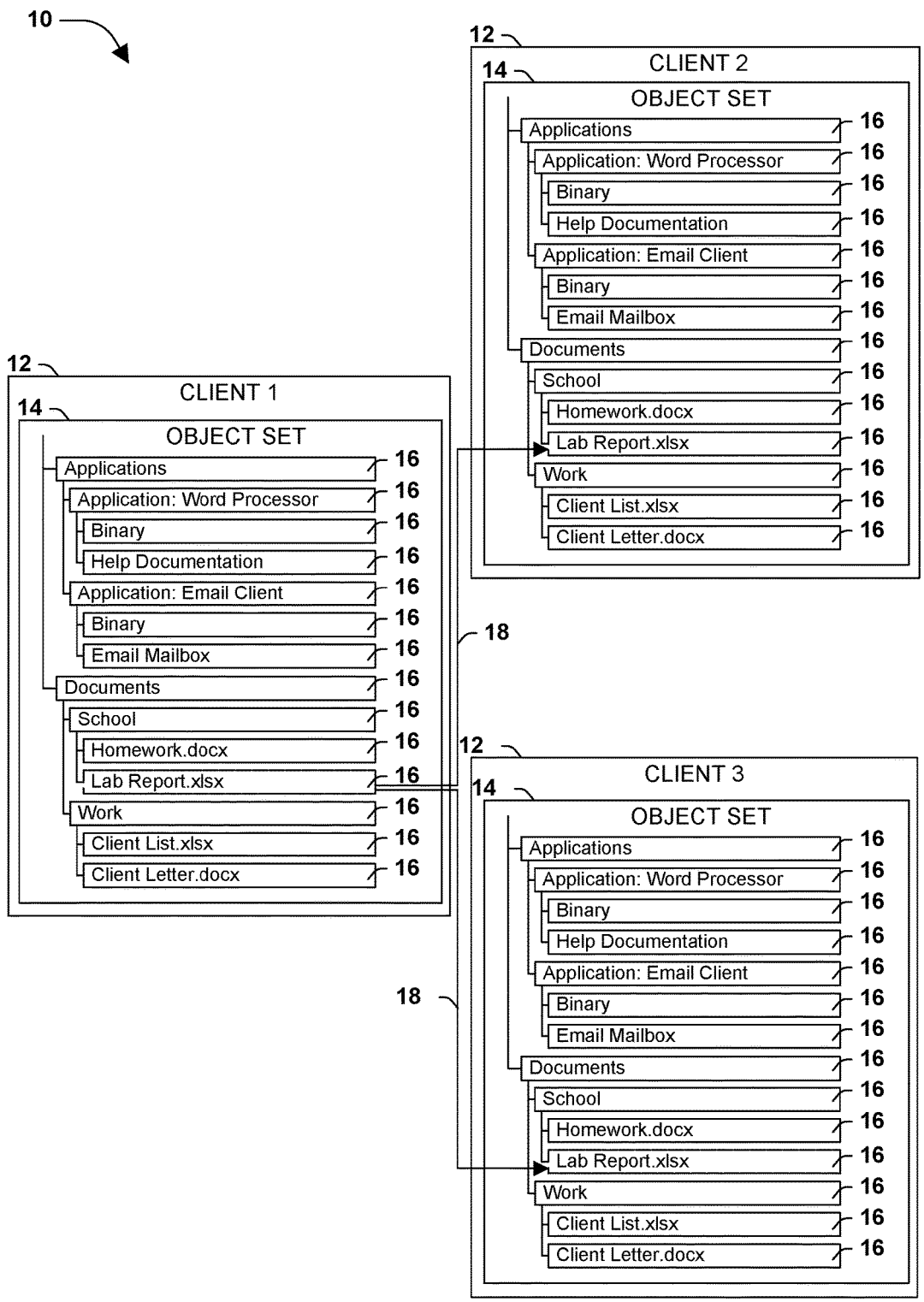
FIG. 1 is an illustration of an exemplary scenario featuring a synchronization of objects comprising an object set among a set of clients.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a synchronized object set comprising a set of objects, wherein two or more clients each store at least a portion of the object set (e.g., a subset of objects), and wherein an addition or change to one or more objects by a first client results in an automated propagation of such new or updated objects to the other clients. For example, two devices may each store identical copies of a filesystem, and when one device adds, modifies, or deletes an object, the filesystem of the other device is automatically updated to reflect the changes to the filesystem. This synchronization may be performed, e.g., by a synchronization service operating on each device that sends notification of changes to corresponding synchronization services operating on the other device(s), and that, upon receiving such a notification of a change on another device, negotiates to receive and apply appropriate data to update the locally stored version of the object set.

FIG. 1 presents an illustration of an exemplary scenario 10 featuring a set of clients 12 configured for automatic synchronization of objects 16 in an object set 16. In this exemplary scenario 10, the object set 14 may represent a filesystem stored in a storage device of each client, where some or all of the filesystems of the various clients are automatically synchronized in order to propagate filesystem changes received by one client to the filesystems of the other clients. As further illustrated in this exemplary scenario 10, the object sets 14 are structured in a tiered manner, such as a set of folders containing zero or more files and subfolders. Each object 16 may therefore be identified by a distinctive name in the object set 14 according to the nested set of folders containing the object 16. Moreover, each client 12 is configured for automatic synchronization of changes to the objects 16 and/or the object set 14 with the other clients 12; e.g., upon detecting a change to a particular object 16 named "Lab Report.xlsx" stored in the "Documents" top-level folder, the client 12 may contact the other clients 12 and may perform a synchronization 18 by delivering the name and contents of the object 16 to the other clients. Each client 12 may also be configured to receive changes to various objects 16 from other clients 12, and to apply such changes to the locally stored version of the object set 14. In this manner, the clients 12 may be configured to propagate changes to the object set 14 (including the creation of a new file, modification of a file, deletion of a file, and relocation, copying, or renaming of an object 16) with the other clients 14, without involving a manual intervention of a user.

The synchronization of objects 16 in an object set 14 may be useful in many scenarios. For example, the computing environment of a user may include a set of applications (such as an operating system, an office productivity suite, a web browser, an email client, and one or more media applications), a set of media objects (e.g., photos, music, and movies), and a set of documents and other files created, acquired, altered, and/or consumed by the user. The computing environment may also include other types of data and computing concepts that may be useful to the user, such as configuration settings of one or more applications; bookmarks of various locations on a network such as the internet that may be of interest to the user; security credentials, such as authenticating certificates, that may be used by the user to assert his or her identity or to verify the identity of another individual; or cryptographic keys that may be used to exchange encrypted data with other users and with security-oriented websites. The computing environment may also involve various concepts, such as a set of one or more users having access to the computer environment and/or ownership of data or objects), and a representation of one or more devices that may be operated by the user (e.g., a workstation device holding a filesystem; a portable computer, such as a notebook, that stores a mirrored portion of the same filesystem and a cellphone device and a portable music player that each store a portion of the filesystem relevant to the capabilities of each device). In order to facilitate this computing environment, an object set may be devised that represents a broad and diverse set of objects, such as files, data objects, database records, email mailboxes, applications, application settings of various applications, contacts in an address book, user accounts of various users, devices through which the computing environment may be accessed, bookmarks, identity authentication credentials, cryptographic keys, etc. All of these diverse types of objects may be modeled in an object set, and relevant portions of the object set may be deployed to various devices through which the user accesses the computing environment (e.g., a "mesh" of devices). This scenario may promote a uniform computing environment across devices. As a first example, a device may be aware of all other devices of the mesh of the user that are represented in the computing environment, and may be able to communicate therewith in a convenient manner. Moreover, if each device is configured to utilize the same object set, a more uniform computing experience may be achieved across devices; e.g., each device provide access to the same set of applications configured in the same manner, and exposes the same set of user-accessible data objects.

Figure 2:
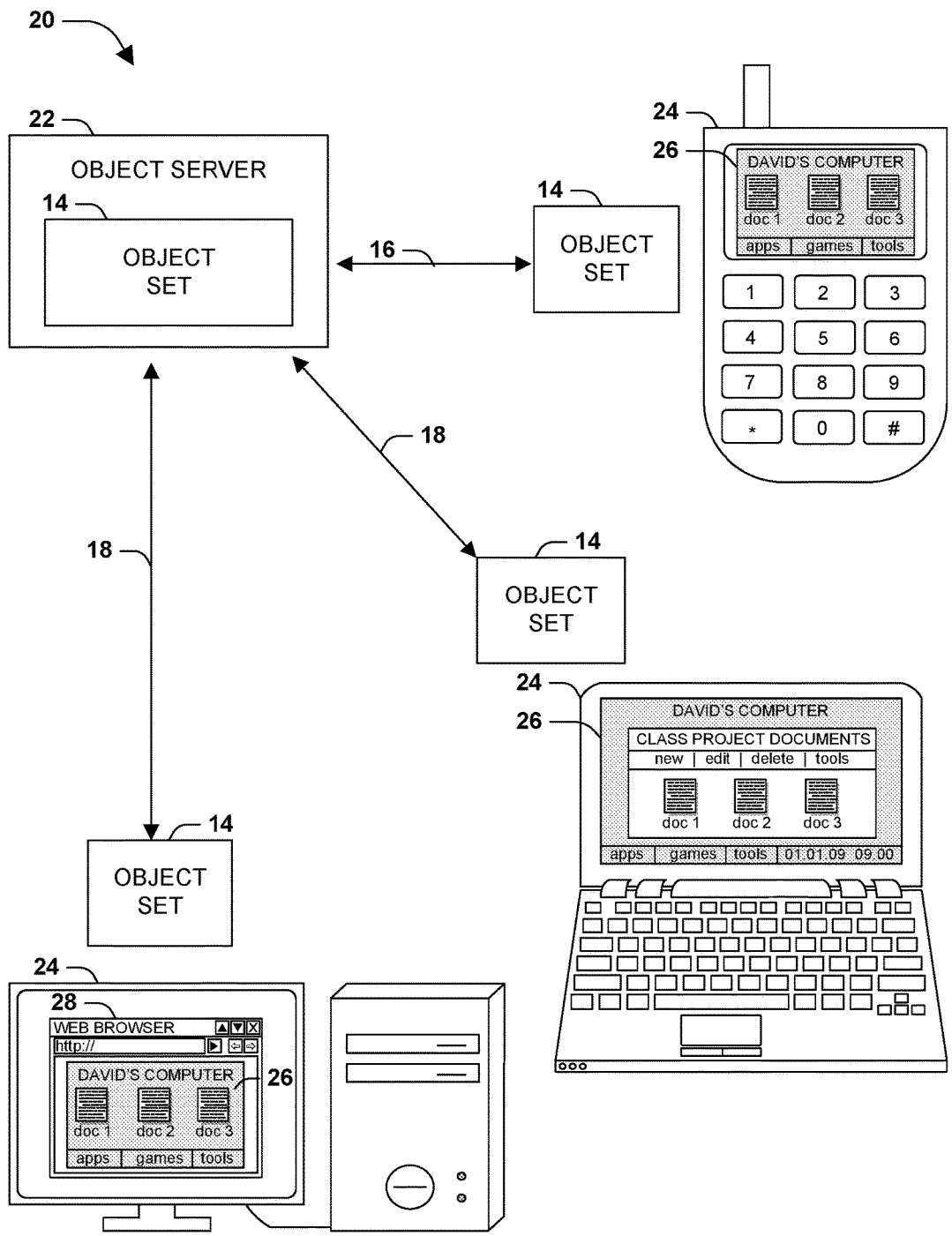
FIG. 2 is an illustration of an exemplary scenario featuring a synchronization of objects comprising an object set managed by an object server among clients operating on a set of devices.

FIG. 2 presents one such scenario, wherein a computing environment of a user is represented as a deployable computing environment that is deployed to a set of computers and devices and centrally managed by a object server. In order to reduce the complex variety and decentralization of the data objects comprising a contemporary computing environment, a deployable representation of the computing environment may be devised, where the data objects comprising the computing environment are organized in a data object set, which may be hosted by a object server. If the data objects are represented in a uniform manner and managed in a consistent way by a data object system, a set of services may be devised to apply to all data objects of the computing environment. The data object set may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) It may also be advantageous to configure at least one server to manage one or more data objects within the representation, and to accept operations sets (e.g., sets of Create, Read, Update, and Delete operations) to be applied to such data objects. A user of the deployable computing environment may therefore interact with the deployable computing environment in a platform- and device-independent manner.

FIG. 2 illustrates one such scenario 20, wherein the computing environment may be hosted by a object server 22, which may store and manage a deployable computing environment. The object server 22 may also render the deployable computing environment in different ways on behalf of various devices 24, such as a cellphone device 21, a personal notebook computer, and a public workstation, and also on behalf of different types of users having different access privileges. The rendering of the computing environment 26 therefore reflects a consistent computing environment across all devices that expose the same applications, user profiles, shell configuration, user data objects, etc. Thus, a user may access a full-featured version of the computing environment 26 through a high-performance notebook computer device 24, a stripped-down version of the computing environment 26 on a low-power cellphone device 24, and a browser-compatible and privacy-oriented version of the computing environment 26 through a web browser of a public workstation device 24. To the extent that the capabilities of each device 24 support the rendering of the computing environment 26, a consistent user interface and data set may be presented due to the rendering of the deployable computing environment adjusted to the capabilities of each device 24. Updates to the computing environment 26 may be propagated back to the object server 22, and may be automatically synchronized with other devices 24. Accordingly, an automated synchronization of objects 16 comprising the object set 14 among the devices 24 and the object server 22 may facilitate the convenient presentation of the computing environment 26 to the user.

However, within this and other scenarios involving a synchronization of objects 16 in an object set 14, the synchronization of a particular object 16 may be a comparatively complex process. While it may be desirable to present a user with a set of objects that are fully synchronized, the complexities of the synchronization process may delay the discovery of some objects 16 or changes thereto or the receipt of discovered objects upon a particular device. For example, when an object 16 is created on a first device 24 in the computing environment (e.g., the mesh of devices operated by a user), the first device may have to notify the object server 22, and may then have to transmit the object 16 to the object server 22 over a network (which may be low-bandwidth or intermittent). The object server 22 may then have to notify a second device 24 represented in the computing environment of the creation of the object 16. This notification may not occur promptly; e.g., the object server 22 may only periodically notify devices 24 of changes to the object set 14 in order to economize network and computing resources. Additionally, the object server 22 may have to transmit the object 16 to the second device 24 (and again, this transmission may also occur over a low-bandwidth or intermittent network). Alternatively, the object 16 may simply be represented within the computing environment 26, but the object server 22 may indicate to the second device 24 that the object 16 is stored on the first device 24, and the second device 24 may (promptly or in an ad hoc manner, e.g., when the object 16 is used by the user) endeavor to contact the first device 24 to retrieve the object 16. Moreover, the second device 24 may receive the object 16 in a temporary data area, such as a working folder of a filesystem, and may have to process the received object 16, e.g., by verifying the integrity of the object 16 and/or performing a malware scan on the object 16. Finally, the second device 24 may have to relocate the object 16 from the temporary data area to a canonical location in the object set 14. Until this potentially lengthy process is completed, the second device 24 may not present the object 16 in the object set 14, or may present the object 16 but may be unable to grant access to the object 16 (e.g., the object 16 may appear as a file within the filesystem of the second device 24, but the second device 24 may be unable to allow the user to access the object 16 until it is fully received and processed). For these and other reasons, the synchronization of an object 16 from a first device 24 to a second device 24 may not occur promptly, and may involve a noticeable delay.

Additionally, some complexities of this process may cause the synchronization to fail and/or to necessitate the attention of the user to resolve particular issues. As a first example, an object 16 may exist on the first device 24, but the second device 24 may have difficulty contacting the first device 24 over a network. This difficulty may arise, e.g., due to firewall restrictions, a network partitioning into a first network portion servicing the first device 24 and a second network portion servicing the second device 24, or a network disconnection of the first device 24. As a second example, an object 16 may exist on the first device 24, but before the object 16 may be fully received by the second device 24, the representation of the first device 24 may be removed from the object set 14, such that the second device 24 cannot contact the first device 24 to retrieve the object 16. As a third example, the second device 24 may be able to contact the first device 24 to request the object 16, but the first device 24 may be temporarily unable to send the object 16, e.g., if the object 16 is exclusively locked by a user of the first device 24 and cannot be read for a while. As a fourth example, the second device 24 may fully retrieve the object 16, but may, upon attempting to relocate the object 16 from a temporary data area to a canonical location in the object set 14 (e.g., to a location in a filesystem where the object 16 is to exist), the second device 24 may find an existing object 16 stored in the canonical location in a locked manner (e.g., a file may be in use by a user), such that the second device 24 cannot overwrite the existing object 16 with the newly received object 16. As a fifth example, the second device 24 may discover that the object 16 cannot be relocated to the canonical location, e.g., due to a lack of storage space or insufficient access (e.g., the user may not have access privileges to write the object 16 to the canonical location on the second device 24). As a sixth example, the second device 24 may fully retrieve the object 16 in a particular version, but, upon attempting to relocate the object 16 to the canonical location in the object set 14, may find that an alternative version of the object 16 already exists that causes a versioning conflict (e.g., a first user may edit the object 16 on the first device 24 while a second user concurrently edits the object 16 on the second device 24), and the second device 24 may be unable to determine which version of the object 16 to keep without the intervention of the user. For these and other reasons, the synchronization of an object 16 may fail, or may be unable to be completed in a safe manner without the involvement of the user.

In view of these complexities of the synchronization process, it may be appreciated that the synchronization of a particular object 16 may be delayed, may fail, and/or may necessitate the intervention of the user. However, it may be difficult for the user to determine the synchronization state of a particular object 16. For example, the device 24 may simply present to the user the currently existing set of fully synchronized objects 16, and objects 16 that are not yet fully synchronized may simply not be visible within the computing environment 26, or may exist in older versions (e.g., a first object version of an object 16 may be presented to the user within the computing environment 26 until a second object version is fully received and processed by the device 24). However, the user may know that a particular object 16 exists in the object set 14 (e.g., the object 16 may be visible on another device 24), or exists within a different version, but the object 16 or object version may not appear to the user within the computing environment of the device 24 until the synchronization process is complete, and the user may be unable to determine why this synchronization process has not yet completed. Additionally, if the device 24 is unable to complete the synchronization process (e.g., due to a file lock), the user may be unable to determine why the synchronization has not completed, and may not be able to intervene to resolve the failure without this information. These deficiencies may lead to undesirable inconsistencies in the presentation of the object set 14 across the devices 24 of the mesh of the user.

Figure 3:
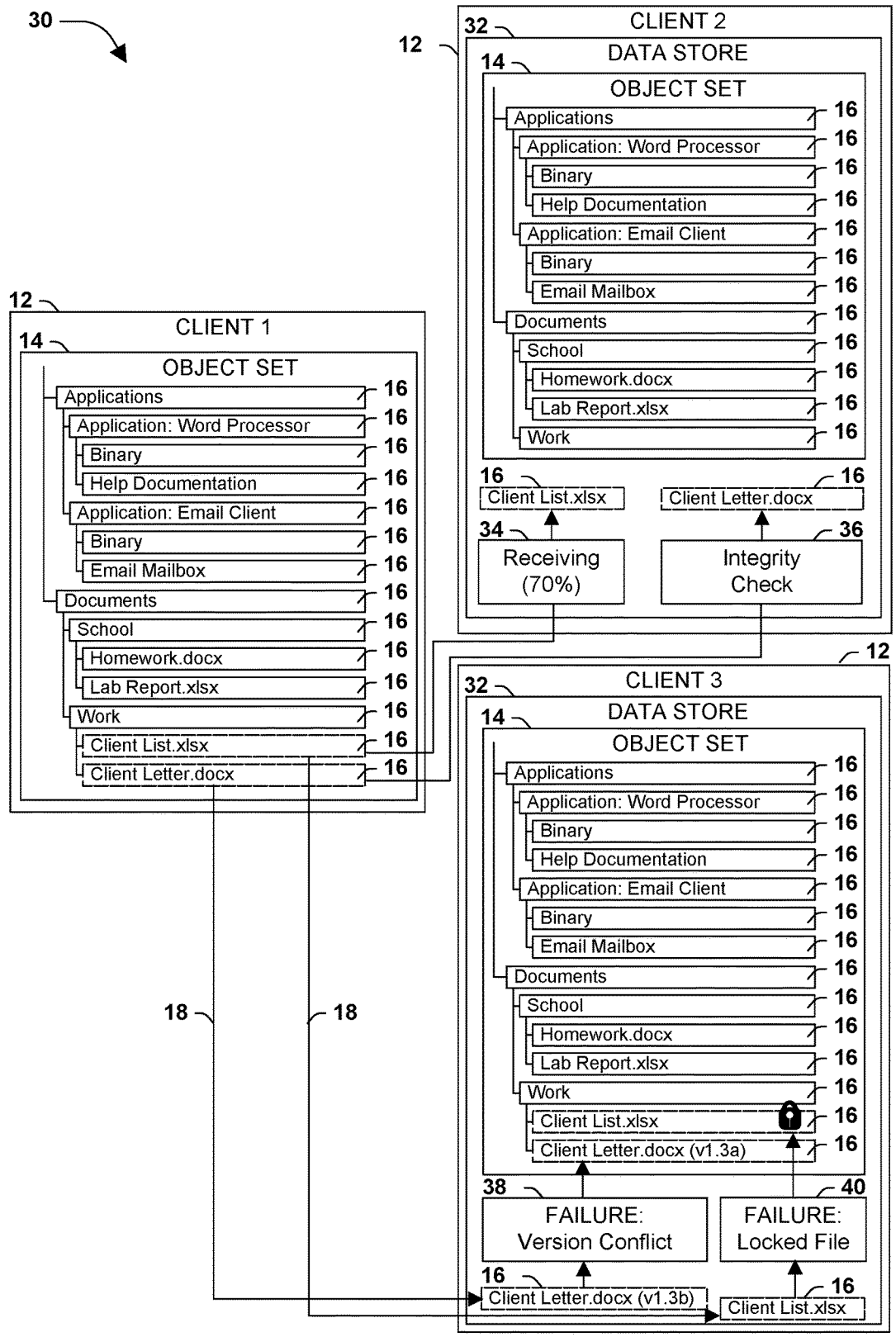
FIG. 3 is an illustration of another exemplary scenario featuring a synchronization of objects comprising an object set among a set of clients.

FIG. 3 presents an exemplary scenario 30 featuring various types of complexity in the synchronization of objects 16 of an object set 14 that may reduce the availability of objects 16 on different devices 24. In this exemplary scenario 30, three clients 12 (e.g., synchronization services operating on three different devices 24) endeavor to synchronize the objects 16 of the object set 14 in response to changes thereto on the first client 12. For example, within a folder named "Work", two objects 16 may be created: a first document named "Client List.xlsx" and a second document named "Client Letter.docx". (Alternatively, these objects 16 may already exist among the clients 12 in a fully synchronized state, but a user may change both objects 16.) Upon receiving these objects 16, the first client 12 may endeavor to synchronize these objects 16 with the other clients 12. Accordingly, a synchronization 18 may be performed between the first client 12 and each other client 12 for each new (or updated) object 24. However, in this exemplary scenario 30, each synchronization 18 may not yet be complete, or may fail, for a different reason. As a first example, the first object 16 may still be in the process of transmission 36 from the first client 12 to the second client 12; this may be a lengthy process, e.g., if the object 16 is large, and/or if the network connection between the first client 12 and the second client 12 is low-bandwidth and/or intermittent. As a second example, the first object 16 may have completed transmission 34 from the first client 12 to the second client 12, but, instead of being placed in a canonical location in the object set 14 (e.g., within the "Work" folder of the filesystem of the second client 12), the second client 12 may have to perform various types of processing 36, such as an integrity check (e.g., a checksum comparison to verify that the object 16 has been fully received without data errors) and/or a malware scan. Accordingly, the object 16 may exist within a data store 32 of the second client 12 (e.g., within system memory, or within a temporary data area of a storage device such as a hard disk drive), but may not yet exist in the object set 14.

As a third example of synchronization complexity illustrated in the exemplary scenario 30 of FIG. 3, the first object 16 may have completed transmission 34 from the first client 12 to the third client 12, which may have stored the first object 16 in the data store 32, and may have completed the processing 36 of the first object 16. However, when the third client 12 endeavors to relocate the first object 16 to its canonical location in the object set 14, the third client 12 may find that while the received first object 16 exists in a particular version (e.g., a version "A"), an alternative version of the first object 16 (e.g., a version "B") exists at the canonical location. The third client 12 may be unable to select which version has priority (e.g., if version "A" was created by a first user while version "B" was created by a second user), and a version conflict 38 may therefore arise that cannot be resolved by the third client 12 without the intervention of the user. As a fourth example, the second object 16 may have completed transmission 34 from the first client 12 to the third client 12, which may have stored the second object 16 in the data store 32, and may have completed the processing 36 of the second object 16. However, when the third client 12 endeavors to relocate the second object 16 to its canonical location in the object set 14, the third client 12 may find that a previous version of the second object 16 exists at the canonical location but is locked against writing. Even if the first object version of the second object 16 may be safely overwritten with the second object version, the third client 12 may be unable to perform this overwriting due to the locking of the first object version of the objet 16 at the canonical location, resulting in a locked file failure 40.

For the reasons illustrated in the exemplary scenario 30 of FIG. 3 and various other reasons, the synchronization of the objects 16 may fail. However, in all four cases, the second client 12 and the third client 12 may be configured to present to the user only the objects 16 (and versions thereof) for which synchronization has completed. The first object 16 and the second object 16 may therefore not appear to the user in the object sets 14 of the second client 12 and the third client 12, or may appear as older versions of such objects 16, and the user may be unable to determine the reasons for the inconsistently presented object sets 14 among the clients 12 of the computing environment.

Presented herein are techniques for presenting to a user an availability status of an object 16 of an object set 14. These techniques involve evaluates the object 16 to determine whether the object 16 is available and has been fully synchronized, and if not, the reasons for the lack of synchronization. This evaluation may include an evaluation of the connection state and availability of other clients 12 (e.g., via a communication network or inter-process communication channel), communication with the object server 22, and/or the state of the data store 32 of the device hosting the client 12. The availability statuses of various objects 16 of the object set 14 may then be presented to the user, e.g., as a list, or as a property of one or more selected objects.

Figure 4:
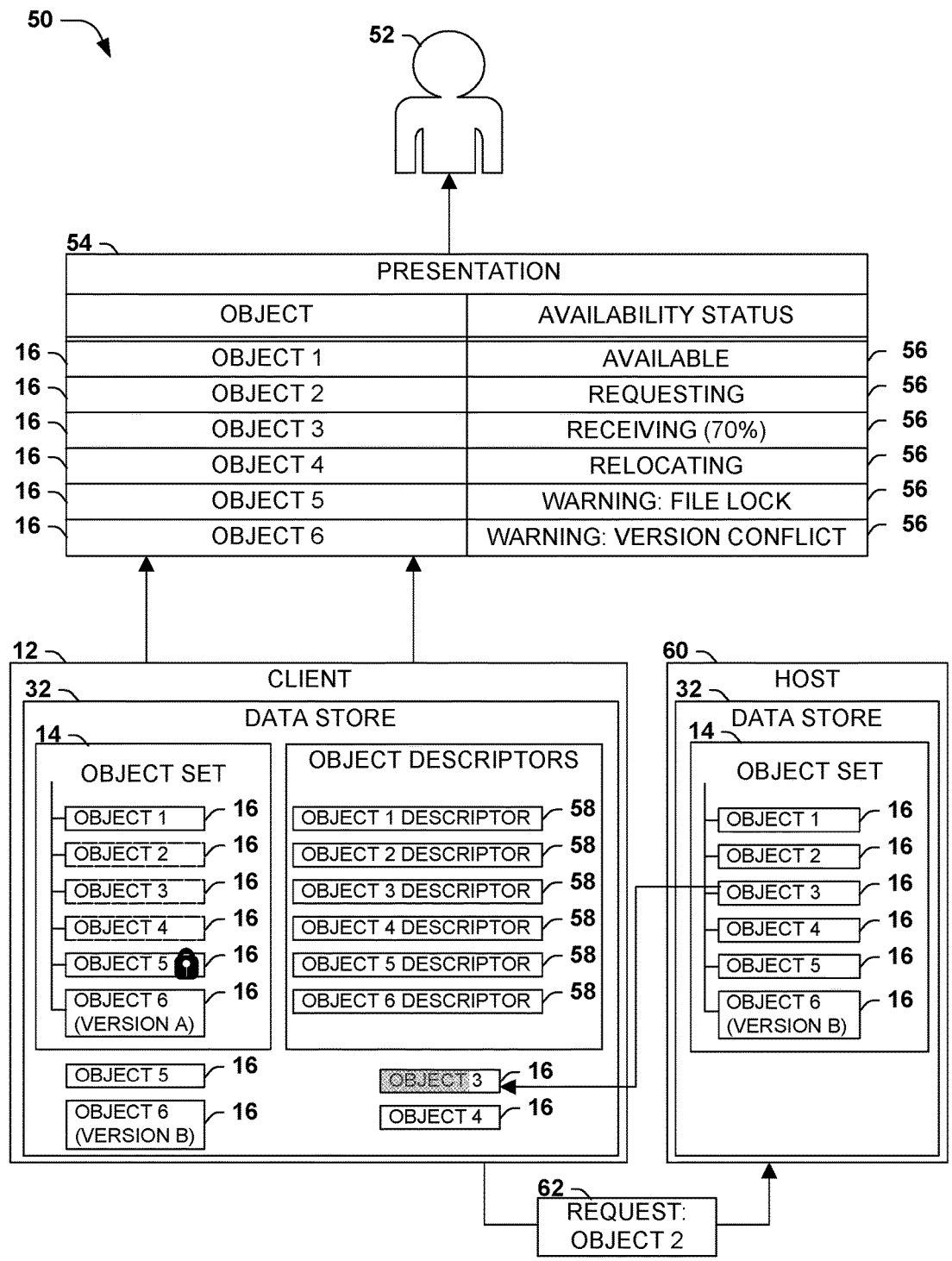
FIG. 4 is an illustration of a presentation to a user of availability statuses of respective objects in an object set in accordance with the techniques presented herein.

FIG. 4 presents an exemplary scenario 50 involving the application of the techniques presented herein to identify the synchronization states of various objects 16 and a presentation 54 of this information to a user 52 of a client 12. The client 12 may comprise a data store 32 configured to store various objects 16 (e.g., a storage device comprising a filesystem storing a set of files), and within this data store 32, the client 12 may store an object set 14 comprising a set of objects 16 that are synchronized with other clients 12. Other objects 16 may be stored in the data store 32, but may not be part of the object set 14; e.g., the client 12 may store device-specific objects 16, such as a set of files comprising an operating system, a set of hardware drivers for the hardware components of the device, and a set of entries in a cache that may facilitate the performance of the client 12. These objects 16 may only pertain to the specific client 12 and/or device hosting the client 12, and my therefore not be synchronized with other clients 12. Also, In accordance with the techniques presented herein, respective objects 16 of the object set 14 may be associated with an object descriptor 58 that indicates an availability status 56 of the object 16. Upon receiving a notification of the creation of an object 16 in the object set 14, the client 12 may create an object descriptor 58 for the object 16, or may receive an object descriptor 58 from the object server 22. The client 12 may then update the object descriptor 58 upon detecting various events relating to the synchronization of the object 16, such as a receipt of the object 16 from another client 12, a relocation of the object 16 to a canonical location in the object set 14 (e.g., from a temporary storage location in a filesystem to a canonical location of the file), a notification of a modification of the object 16 that is to be applied in order to update the object 16 to a current version, or a versioning conflict.

Within this exemplary scenario 50 of FIG. 4, the user 52 may request a presentation 54 of the synchronization states of all objects stored by the device and synchronized with other clients 12, or of a subset of these objects 16 (e.g., recently synchronized objects). The user 52 may also specify a particular object 16 or set of objects 16, such as a particular file or a set of files comprising an application, and may request the availability statuses 56 thereof. In accordance with the techniques presented herein, the client 12 may perform an analysis of the object 16, such as an examination of the object set 14 to determine the availability of the object 16, an examination of the data tore 32 to determine the presence of the object 16 (e.g., the receipt of an object 16 that has not yet been fully processed and that is not yet available in the object set 14), and the existence of a versioning conflict among two versions of the object 16. The analysis of the object 16 may also include an examination of the object descriptor 58 of the object 16, which may include information relevant to the availability status 56 of the object 16 and that may not be determined by examining the object 16 itself. This information may therefore be included in a presentation 54 to the user 52 of the availability statuses 56 of the objects 16.

For example, in the exemplary scenario 50 of FIG. 4, six objects 16 are represented as existing in the object set 14. A first object 16 may be available in the object set 14. The client 12 may have received a notification of the existence of a second object 16, but may be in the process of contacting another client 12 that is storing the second object 16 (e.g., by sending to the other client 12 a request 62 to transmit the second object 16). A third object 16 may be in the process of being transmitted from another client 12 to the client 12 (e.g., over a network), and although the client 12 may not represent the third object 16 as available in the object set 14, the client 12 may be storing the received portion of the third object 16 in the data store 32 (e.g., in a temporary location where data from pending downloads may be temporarily stored). A fourth object 16 may have been fully received by the client 12, but may be in the process of being relocated to a canonical location in the object set 14 (e.g., a moving of data from a first storage device, where the data of the fourth object 16 was stored during transmission to a second storage device where the fourth object 16 belongs, according to the object set 14). A fifth object 16 may have been fully received, and may be stored in the data store 32, but upon endeavoring to relocate the fifth object 16 to a canonical location, the client 12 may have encountered a locking problem, such as a presence of an earlier version of the fifth object 16 at the canonical location that in use by the user, and that therefore is locked against overwriting. Similarly, a first object version of a sixth object 16 (e.g., "version A") may also have been fully received and may exist in the file store 32, but upon endeavoring to move the sixth object 16 to a canonical location in the object set 14, the client 12 may have encountered a versioning conflict, such as the presence of an alternative version of the sixth object 16 (e.g., "version B") at the canonical location, where the versioning priority of the different versions cannot be automatically determined. For example, the user 52 may have been modifying an initial version of the sixth object 16 to generate the first object version, while another user 52 may have been modifying the initial version of the sixth object 16 to generate the second object version. It may be difficult for the client 12 to reconcile the concurrent changes and resulting versions of the sixth object 16 in an automated manner, particularly if such changes are mutually exclusive (e.g., where the first object version alters a paragraph of a document, and the second object version deletes the paragraph).

In this exemplary scenario 50, and in accordance with the techniques presented herein, the client 12 may present the availability statuses 56 of respective objects 16 by examining various factors of the object 16 that are determinant of the availability status 56. For example, the client 12 may examine the availability of the object 16 in the data store 32 and/or the object set 14, the representation in the computing environment of one or more clients 12 storing the object 16, and whether or not the object 16 is currently being received from one or more hosts. The client 12 may also determine whether various conflicts exist, such as a locking conflict or a versioning conflict. In some such embodiments, and in this exemplary scenario 50, the client 12 may monitor events that are associated with these availability statuses 56 for respective objects 16, and upon detecting such an event for an object 16, may store corresponding information in the object descriptor 58 of the object 16. When the user 52 requests the availability status 54 of one or more objects 16, the client 12 may examine the object descriptors 56 of the objects 16 (in addition to other properties of the object 16) in order to determine the availability statuses 56. The client 12 may then generate a presentation 54 for the user 52 featuring the availability statuses 56. In this manner, the client 12 may fulfill the query of the user 52, which may satisfy the curiosity of the user 52, allow the user 52 to anticipate the availability of an object 16, and/or resolve conflicts that may interfere with the availability of an object 16.

Figure 5:
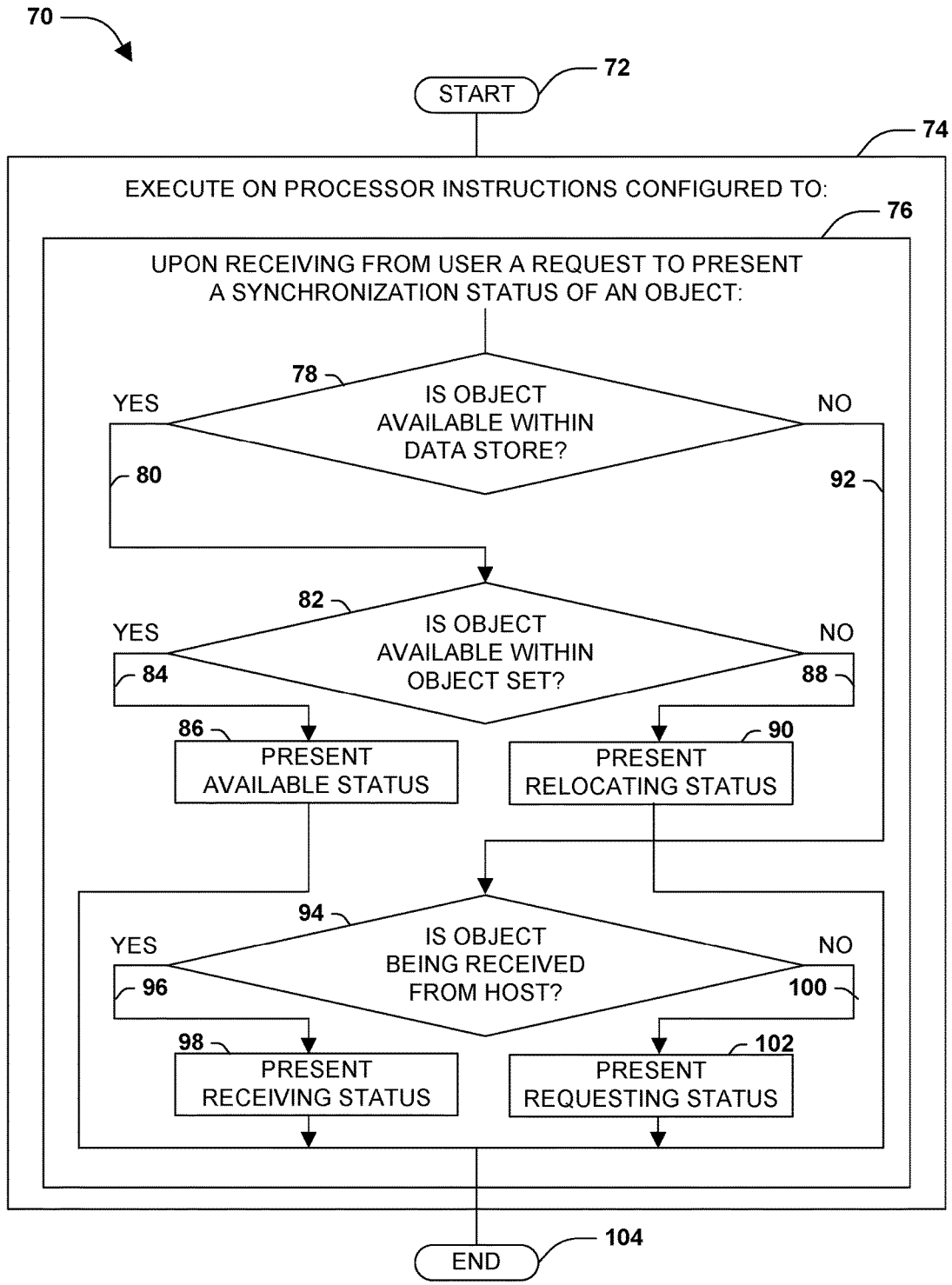
FIG. 5 is a flow chart illustrating an exemplary method of presenting a user an availability status of objects in an object set.

FIG. 5 presents a first embodiment of these techniques, illustrated as an exemplary method 70 of presenting, to a user 52 of a client 12, availability statuses 56 of objects 16 in an object set 14 within a computing environment comprising at least one host. The exemplary method 70 may be performed, e.g., on a device 24 having a processor, and may be implemented as a set of software instructions that are stored in a memory component of the device 24 (e.g., system memory, a hard disk drive, a solid-state storage device, or a magnetic or optical disc) and that are executable on the processor. The exemplary method 70 begins at 72 and involves executing 74 on the processor instructions configured to perform the techniques presented herein. Specifically, the instructions are configured to, upon receiving 76 a request to present to the user 52 an availability status 56 of an object 16, first determining 78 whether the object 16 is available in the data store 32. Upon determining 80 that the object 16 is available in the data store 32, the exemplary method 70 involves determining 82 whether the object 16 is available in the object set 14. If so 84, the exemplary method 70 presents 86 to the user 52 an available status (indicating that the object 16 is available), and then ends at 104. Contrarily, if the object 16 is determined not 88 to be available in the object set 14, the exemplary method 70 involves presenting 90 to the user 52 a relocating status, and then ends at 104. However, if the object 16 is initially determined not 92 to be available in the data store 32, the exemplary method 70 involves determining 94 whether the object 16 is being received from a host (e.g., another client 12 and/or device 24 hosting the object 16, including an object server 22). If so 96, the exemplary method 70 involves presenting 98 a receiving status, and then ending at 104; but if not 100, the exemplary method 70 involves presenting 102 a requesting status, and then ending at 104. In this manner, the exemplary method 70 determines the availability of the object 16. Additional variations (including those presented herein) may present more detailed information, such as the detection of locking conflicts and/or versioning conflicts associated with the object 16.

Figure 6:
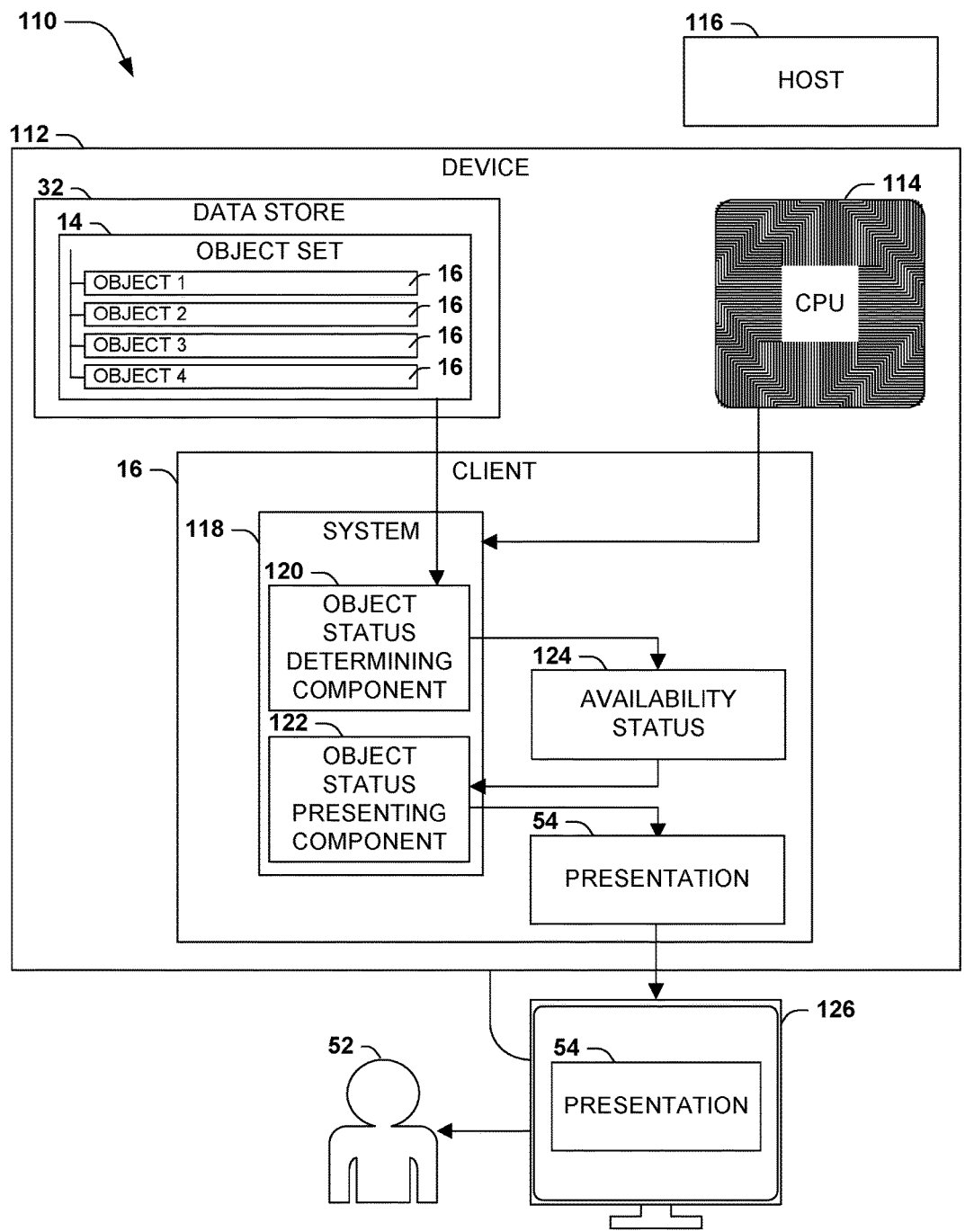
FIG. 6 is a component block diagram illustrating an exemplary system for presenting a user an availability status of objects in an object set.

FIG. 6 presents a second embodiment of these techniques, illustrated as an exemplary system 118 configured to present, to a user 52 of a client 12 on a device 24 having a processor 114 and a data store 32, availability statuses 56 of respective objects 16 in an object set 14 within a computing environment comprising at least one host 116. The exemplary system may be implemented, e.g., as a software architecture comprising a set of interoperating software components, each of which in a memory component of the device 24 (e.g., system memory, a hard disk drive, a solid-state storage device, or a magnetic or optical disc), and each of which performs one or more tasks related to the presentation 54 of availability statuses 56. The exemplary system 114 comprises an object status determining component 120, which is configured to, for respective objects 16 of the object set 14, select an availability status 56. The object status determining component 120 may determine the availability status 56 of the object 16 by examining various properties of the object 16 (including, in some embodiments, information stored in an object descriptor 56 of the object 16). For example, upon determining that the object 16 is available in the data store 32 and in the object set 14, the object status determining component 120 may select an available status, but upon determining that the object 16 is available in the data store 32 but unavailable in the object set 14, may select a relocating status. Conversely, upon determining that the object 16 is unavailable in the data store 32 but is being received from a host 116, the object status determining component 120 my select a receiving status; and upon determining that the object 16 is unavailable in the data store 32 and is not being receive from a host 116, the object status determining component 120 may select a requesting status. The exemplary system 118 also includes an object status presenting component 122, which is configured to, for respective objects 16 of the object set 14, present to the user 52 the selected availability status. In this manner, the components of the exemplary system 118 interoperate to inform the user 16 of the availability status 56 of respective objects 16 of the object set 14.1.

Figure 7:
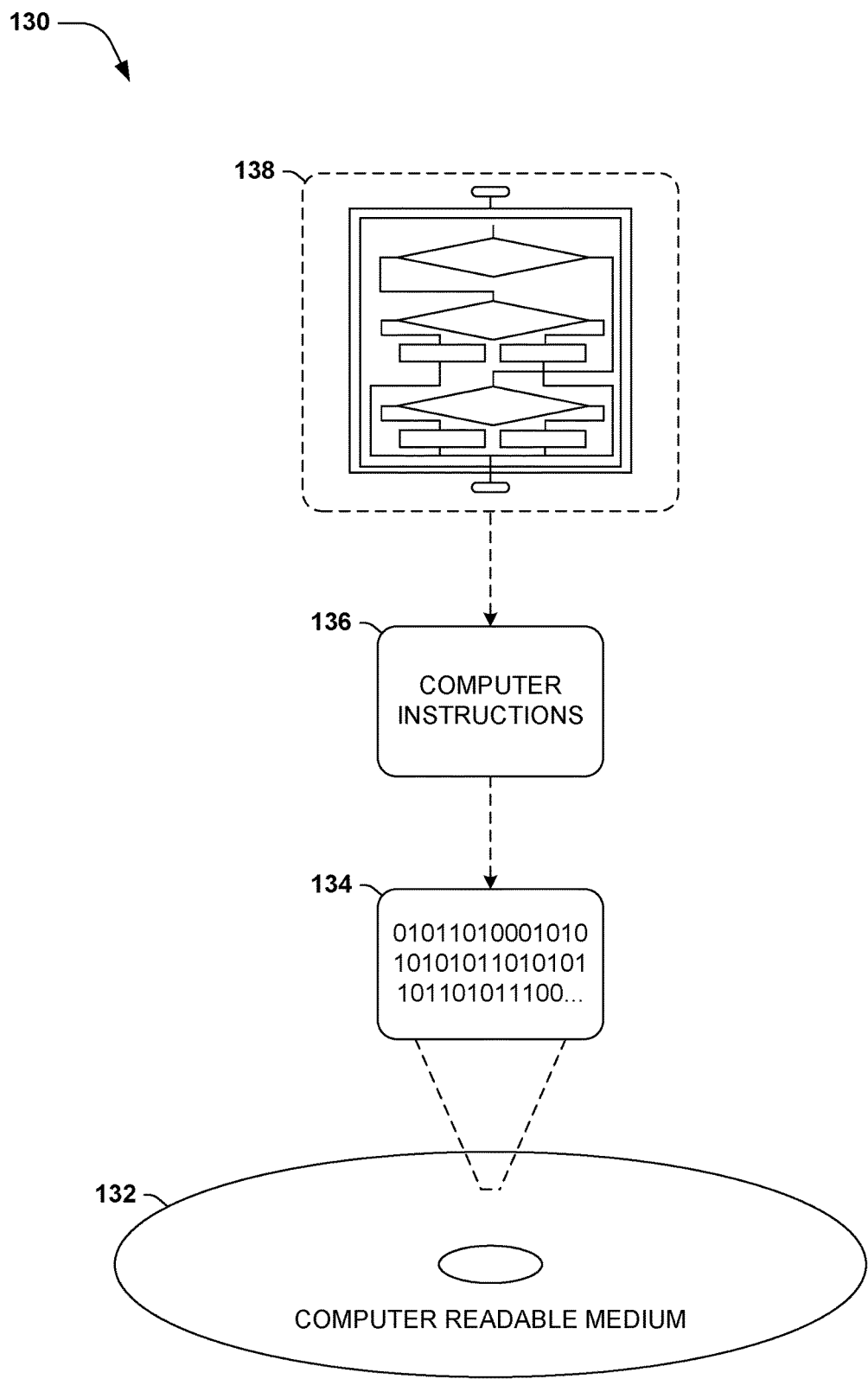
FIG. 7 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 7, wherein the implementation 130 comprises a computer-readable medium 132 (e.g., a CD-R, DVD-R, or a platter of a hard disk drive), on which is encoded computer-readable data 134. This computer-readable data 134 in turn comprises a set of computer instructions 136 configured to operate according to the principles set forth herein. In one such embodiment, the processor-executable instructions 136 may be configured to perform a method of presenting a user an availability status of objects in an object set, such as the exemplary method 70 of FIG. 5. In another such embodiment, the processor-executable instructions 136 may be configured to implement a system for presenting a user an availability status of objects in an object set, such as the exemplary system 118 of FIG. 6. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 70 of FIG. 5 and the exemplary system 118 of FIG. 6) to confer individual and/or synergistic advantages upon such embodiments.

A first aspect that may vary among embodiments of these techniques relates to the scenarios wherein such techniques may be utilized. FIG. 2 presents a first exemplary scenario 20 wherein these techniques may be utilized to present the synchronization and availability of objects 16 in an object set 14 managed by an object server 22 among a set of devices 24 comprising a mesh. Such devices 24 may communicate exclusively with the object server 22, or with each other in a client-server protocol and/or a peer-to-peer exchange protocol. However, other scenarios may also be suitable for application of the techniques presented herein. For example, the techniques may utilized to present the availability of objects 16 synchronized among two or more devices 24 without an object server 22, such as objects 16 shared over a peer-to-peer exchange protocol, or objects 16 stored by a first client 12 that are mirrored by one or more other clients 12 (e.g., in a redundant data storage or file service scenario). As a second example, the availability of many types of object 16 may be presented in this manner, including files in a filesystem, database records in a distributed and/or mirrored database, object-oriented objects in an object system (such as CORBA), and email messages in an email sharing system. As a third example, many types of clients 12 may be involved in such synchronization, including a hardware driver configured to manage the data store 32, an operating system component configured to manage the synchronization of objects 16, or an application configured to manage and/or present synchronized objects 16 in the object set 14. Such clients 12 may also include multiple software processes operating on the same device 24. As a fourth example, the objects 16 may be synchronized among clients 12 through many types of networks, including a device-to-device communication channel such as an infrared communication channel; a wired or wireless local area network; a personal area network such as a Bluetooth network; a regional network such as a cellular network; a wide-area network such as the internet; a virtual network among two or more clients 12; an inter-process communication channel; and a hardware bus. Those of ordinary skill in the art may devise many scenarios wherein the techniques presented herein may be utilized.

A second aspect that may vary among embodiments of these techniques relates to the types of availability statuses 124 that may be presented. In accordance with several embodiments of these techniques, a client 12 may be configured to send availability statuses 124 including an available status, a relocating status, a requesting status, and a receiving status. However, some embodiments may also be configured to detect additional availability statuses 124 of various objects 16 that may provide additional details about an object 16, which may facilitate the user 52 in determining when an object 16 may become available, why the object 16 is not currently available, and/or actions that may be taken to alleviate the unavailability of the object 16. As a first example, the requesting status of an object 16 may include additional details about the requesting of the object 16. For instance, a client 12 may determine that an object 16 is stored on a host 116 represented within the computing environment (e.g., a device that is represented within a "mesh" of devices operated by the user 52), and may therefore present a requesting status as a searching status, indicating that the client 12 is searching for the host 116. Alternatively or additionally, a client 12 may determine that no host 116 within the computing environment stores the object 16, and may therefore present to the user 52 a lost status, indicating that the object 16 is only available from one or more hosts 116 that have been removed from the mesh. Moreover, in an additional embodiment, a searching status (indicating that an object 16 is available from at least one host 116 represented in the computing environment) may indicate the progress of the client 12 in contacting the host 116. For instance, upon determining that the hosts 116 storing the object 16 are unreachable (e.g., are represented within the mesh but are not currently accessible, such as due to a network disconnection or a powered-down device), the client 12 may present to the user 52 a host unavailable status; but if at least one host 116 is reachable (e.g., via a communication network), the client 12 may present to the user 52 a host connecting status, indicating that the client 12 is endeavoring to connect to the host 116.

As a second example of this second aspect, an embodiment of these techniques may be configured to detect various types of conflicts that interfere with the relocation of the object 16. A first such conflict involves a locking conflict. For example, an object 16 exists in the object set 14 as a first object version, and a superseding object version of the object 16 may have been fully received and stored in the data store 32; but when the client 12 endeavors to relocate the superseding object version of the object 16 to the object set 14 by overwriting the first object version, the client 12 may discover that the first object version has been locked against overwriting (e.g., the user 52 may be viewing the first object version), such as the locked file failure 40 in the exemplary scenario 30 of FIG. 3. This locking conflict may interfere with the deployment of the subsequent object version of the object 16 to the object set 14, but the user 52 may not understand the nature of this interference. Therefore, upon detecting a locking conflict for an object 16 for which an availability status 124 has been requested by the user 52, the client 12 may present to the user 52 a locking conflict status. A second such conflict involves a versioning conflict, wherein the object 16 exists in the object set 14 as a first object version, and wherein a second object version object of the object 16 is received and stored in the data store 32, but where the client 12 cannot automatically determine which object version of the object 16 supersedes the other object version, such as in the version conflict 38 in the exemplary scenario 30 of FIG. 3. Accordingly, this version conflict may interfere with the deployment of the second object version of the object 16 to the object set 14 (which the user 52 may regard as a superseding object version, but which the client 12 may be unable to resolve automatically), and the user 52 may not understand the nature of this interference. Therefore, upon detecting a versioning conflict for an object 16 for which an availability status 124 has been requested by the user 52, the client 12 may present to the user 52 a versioning conflict status. Those of ordinary skill in the art may devise many types of availability statuses 124 describing an object 16 of the object set 14 while implementing the techniques presented herein.

A third aspect that may vary among embodiments of these techniques relates to the manner of evaluating the object 16 to select an accurate availability status 124. Some embodiments of these techniques may perform the evaluation entirely on an ad hoc basis, e.g., by fully examining all of the causes relating to the availability of each object 16 and reporting corresponding availability statuses 124. However, this evaluation may be complicated, so such embodiments may be undesirably slow, particularly if the availability statuses of many objects 16 may be requested. Therefore, instead of a fully ad hoc evaluation of the availability of respective objects 16, embodiments of these techniques may be configured to detect events relating to the availability of respective objects 16 during the ordinary operation of the client 12, to record the occurrence of such events for respective objects 16, and to use the recorded information to expedite the evaluation of availability of the objects 16 in response to a subsequently received request to report the availability statuses 124 thereof. For example, for respective objects 16 of the object set 14, an embodiment may store an object descriptor 58 featuring at least one object metadatum relating to the availability of the object 16 (e.g., an array of flags that may be set or cleared for the object 16 based on the detection of various events affecting the availability of the object 16). The embodiment may utilize these object metadata to detect some or all aspects of the availability status 124 of the object 16. In different embodiments of these techniques, these object metadata may be sufficiently informative to identify any availability status 124 of the object 16, such that the evaluation of the availability of the object 16 may be entirely performed based on the object descriptor 58 of the object 16; while in other embodiments, the examination of the object descriptor 58 may be combined with other evaluative techniques to identify the availability status 124 of the object 16.

A first example of this third aspect relates to scenarios involving an object server 22 that manages the availability of objects 16 on the client 12 (e.g., a mesh host that manages the availability of an object set 14 among a set of devices 24). In such scenarios, the object server 22 may be configured to send an object descriptor 58 to the client 12 when an object 16, or a new version of an existing object 16, is created in the object set 14, either by the same client 12 or by another client 12. The object descriptor 58 may indicate, e.g., the canonical location of the object 16, one or more hosts 116 that may be storing the object 16 (e.g., one or more devices 24 in a mesh that may currently store the object 16), integrity checking information relating to the object 16 (such as a hash code), and/or versioning information for the object 16 that may be helpful in detecting and/or resolving versioning conflicts. Moreover, the object server 22 may send the object descriptor 58 to the client 12 upon detecting the creation of the object 16, even if the object 16 has not yet been transmitted to the client 12 and/or the object server 22, and the transmission of the object 16 or object version thereof to the client 12 may be subsequently initiated (e.g., when the client 12 has idle processing time and/or spare bandwidth, or when the object 16 is accessed by a user 52). The client 12 may therefore be configured to, upon receiving an object descriptor 58 from the object server 22, store the object descriptor 58 in the data store 32.

Several variations of this first example of this third aspect may be devised. In a first such variation, various events relating to the receipt of an object 16 (as directed by the object server 22) may be detected and stored in the object descriptor 58, and later used to identify an accurate availability status 124 of the object 16. For example, the client 12 may receive from the object server 22 an object descriptor 58 of an object 16 that is unavailable in the data store 32, and where the object descriptor 58 identifies at least one host 116 that is storing the object 16. An embodiment may be configured to, upon receiving the object descriptor 58, request the object 16 from one or more hosts 116, and store a requesting metadatum in the object descriptor 58. Upon receiving at least one object portion of the object 16 from a host 116, the embodiment may be configured to replace the requesting metadatum in the object descriptor 58 of the object 16 with a receiving metadatum, indicating that the object 16 is currently being received. These metadata may then be used to determine the availability status 124 of the object 16 upon request of a user 52; e.g., upon identifying the object 16 as unavailable in the data store 32, the embodiment may determine whether or not the object 16 is currently being received from at least one host 116 by identifying in the object descriptor 58 of the object 16, respectively, a receiving metadatum or a requesting metadatum. As a further level of detail in the determination of availability statuses 124, the requesting of the object 16 from a host 116 may involve, upon first receiving the object descriptor 58 from the object server 22, endeavor to contact at least one host 116, and may concurrently store a searching metadatum in the object descriptor 58 (indicating that the client 12 is searching for a host 116, but has not yet succeeded in requesting the object 16 from a host 116); and upon contacting at least one host 116 and requesting the object 24 from the host 116, the embodiment may replace the searching metadatum in the object descriptor 58 with a requesting metadatum. Accordingly, if the availability status 124 of the object 16 is requested in the interim, the embodiment may be configured to, upon identifying a searching metadatum in the object descriptor 58 of an object 16 for which an availability status 124 has been requested, present to the user a searching status, indicating that the client 12 is searching for one or more hosts 124 from which to request the object 16.

As a second variation of this first example of this third aspect, the object descriptor 58 may store information relating to the accessibility of hosts 116 storing an object 16. For example, when a host 116 is removed from the object set 14 (e.g., when a device 24 is removed from a mesh), the object server 22 may be configured to send the clients 12 a host removal notification. Upon receiving such a notification, an embodiment of these techniques may be configured to identify objects 16 in the object set 14 that are unavailable in the data store 32, and that are no longer stored by any host 116 represented in the object set 14. For such objects, the embodiment may store in the object descriptor 58 of the object 16 a lost metadatum, indicating that the object 16 is no longer available; and upon identifying a lost metadatum in the object descriptor 58 of an object 16 for which an availability status 124 has been requested, the embodiment may present to the user 52 a lost status.

A third variation of this first example of this third aspect relates to the particular scenario of false negative results that may arise within the synchronization scenario. In some scenarios, a new or updated object version of an object 16 may be reported as unavailable until being receiving the object 16 (or object version) from a host 116, but where the object 16 (or object version) is, in fact, already available in the object set 14. This scenario may arise, e.g., where a user 52 synchronizes an object 16 independently of the client 12, such as by copying a new or updated version of an object 16 to the data store 32 at the canonical location of the object 16 within the object set 22 outside the synchronization process, such that the synchronization process is not informed of the copying and availability. Thus, the client 12 may subsequently receive an object descriptor 58 for the object 16 from the object server 22, and may continue to report the object 16 as unavailable until receipt. In accordance with this third variation, such inaccuracies may be reduced by verifying each object descriptor 58 upon receipt, such as by checking the availability of the object 16 in the object set 14 before reporting the object 16 as unavailable. Moreover, until an object descriptor 58 is verified, the object 16 (or updated object version) may be ignored by the client 12. Accordingly, an embodiment of these techniques may be configured to, upon receiving an object descriptor 58 of an object 16 from the object server 22, store in the object descriptor 58 of the object 16 an unverified object metadatum, indicating that the object descriptor 58 has not yet been verified. Upon subsequently verifying that the object 16 is unavailable in the data store 32, the embodiment may replace the unverified object metadatum in the object descriptor 58 of the object 16 with an unavailable metadatum; but upon determining the object 58 is available in the data store 32, the embodiment may replace the unverified object metadatum in the object descriptor 58 of the object 16 with an available metadatum. However, if an availability status 124 of the object 16 is requested in the interim, the embodiment may simply disregard the existence of unverified object descriptors 58, and may report that the object or object version does not exist in the file system. In this manner, an inaccurate reporting of unavailability of objects 16 within the object set 14 may be reduced by verifying the object descriptors 58 upon receipt, and by ignoring such object descriptors 58 in the interim.

A second example of this third aspect relates to the manner of using the object descriptors 58 of objects 16 to identify various availability statuses 124, such as a requesting status, a receiving status, and an available status. For example, an embodiment of these techniques may be configured to, upon receiving an object descriptor 58 of an object 16, store in the object descriptor 58 of the object 16 a requesting metadatum. The embodiment may be further configured to, upon receiving an object portion of an object 16 for which at least one missing object portion is still missing (e.g., where the object 16 has been only partially received), replace the searching metadatum in the object descriptor 58 of the object 16 with a receiving metadatum; and, upon receiving an object portion of an object 16 having no missing object portions (e.g., a fully received object 16), replace the receiving metadatum in the object descriptor 58 of the object 16 with an available metadatum. The embodiment may also be configured to evaluate the availability status 124 of the object as receiving, requesting, or available by detecting in the object descriptor 58 of the object 16, respectively, a receiving metadatum, a requesting metadatum, or an available metadatum. In a further embodiment, an additional level of availability detail may be added, e.g., by, upon receiving the object portion of the object 16 having no missing object portions, store in the object descriptor 58 of the object 16 a relocating metadatum, and, upon inserting the object 16 into the object set 14, replacing the relocating metadatum in the object descriptor 58 of the object 16 with an available metadatum; and determining that the object 16 is available in the data store 32 but unavailable in the object set 16 by identifying in the object descriptor 58 of the object 16 a relocating metadatum. In this manner, an embodiment of these techniques may detect and record events relating to the availability of objects 16 and/or may inform the user 52, as part of the availability status 58, of the process of requesting and receiving an object 16 from one or more hosts 116.

As a third example of this third aspect, the object descriptor 58 may be involved in the detection, presentation, and/or resolution of versioning conflicts among object versions of an object 16. A versioning conflict may arise, e.g., if an object 16 of the object set 14 is modified both by a first user 52 to generate a first object version and a second user 52 to generate a second object version. In such scenarios, a client 12 may be unable to determine how to resolve the versioning conflict, such as whether either object version supersedes the other object version, whether the modifications are to be merged, etc. In the context of the objects 16 of a synchronized object set 16, such a versioning conflict may be detected when a first object version of an object 16 is received by a client 12 and stored in the data store 32, but when the client 12 attempts to relocate the object 16 to a canonical location within the object set 14, a second object version of the object 16 is found to exist at the canonical location. In such scenarios, an embodiment of these techniques may store in the object descriptor 58 of the object 16 a versioning conflict metadatum, indicating the existence of a versioning conflict of the object 16; and upon being requested to present an availability status 56 of the object 16, an embodiment may, upon identifying a versioning conflict metadatum in the object descriptor 58 of the object 16, present a conflict status with regard to the object 16. The versioning conflict may be detected, e.g., by comparing one or more object version identifiers that may be indicative of the object version of each object 16. An object version identifier set of such object version identifiers may be available, and may include, e.g., an object hash code, an object modification date, and an object version indicator (e.g., a version number stored in or associated with the object 16). The embodiment may therefore identify the versioning conflict by detecting one or more object version identifiers in the first object version of the object 16, and then comparing these object version identifiers with corresponding object version identifiers in the second object version of the object 16. Moreover, the object version identifiers that differ between the versions may be presented to the user along with the availability status 56 of the object 16 (e.g., the conflict status).

As a further third example of this third aspect, a further embodiment of these techniques may assist in the resolution of the versioning conflict. For example, the embodiment may allow the user 52 to select one object version of the object 16 (a selected object version) to supersede the other object version of the object 16 (an unselected object version). If the user 52 selects the object version available in the data store 32 but not in the object set 14 (e.g., the recently received object version), the embodiment may be configured to resolve the versioning conflict by copy the selected object version over the unselected object version. Conversely, if the user 52 selects the object version available in the object set 14, the embodiment may resolve the versioning conflict by simply deleting the unselected object version that has been recently received. In either case, upon resolving the versioning conflict, the embodiment may replace the conflict metadatum in the object descriptor 58 of the objet 16 with an available metadatum to indicate the resolution of the versioning conflict. Alternatively or additionally, the embodiment may simply notify the user 52 of the versioning conflict, and, upon detecting a version resolution of the object 16 (e.g., achieved manually by the user 52 or automatically by an application), the embodiment may replace the conflict metadatum with an available metadatum. In this manner, embodiments of these techniques may track, report, and assist in the resolution of versioning conflicts of the objects 16 of the object set 14. Those of ordinary skill in the art may devise many ways of detecting and tracking the availability of objects 16 and reporting the availability statuses 56 thereof to the user 52 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
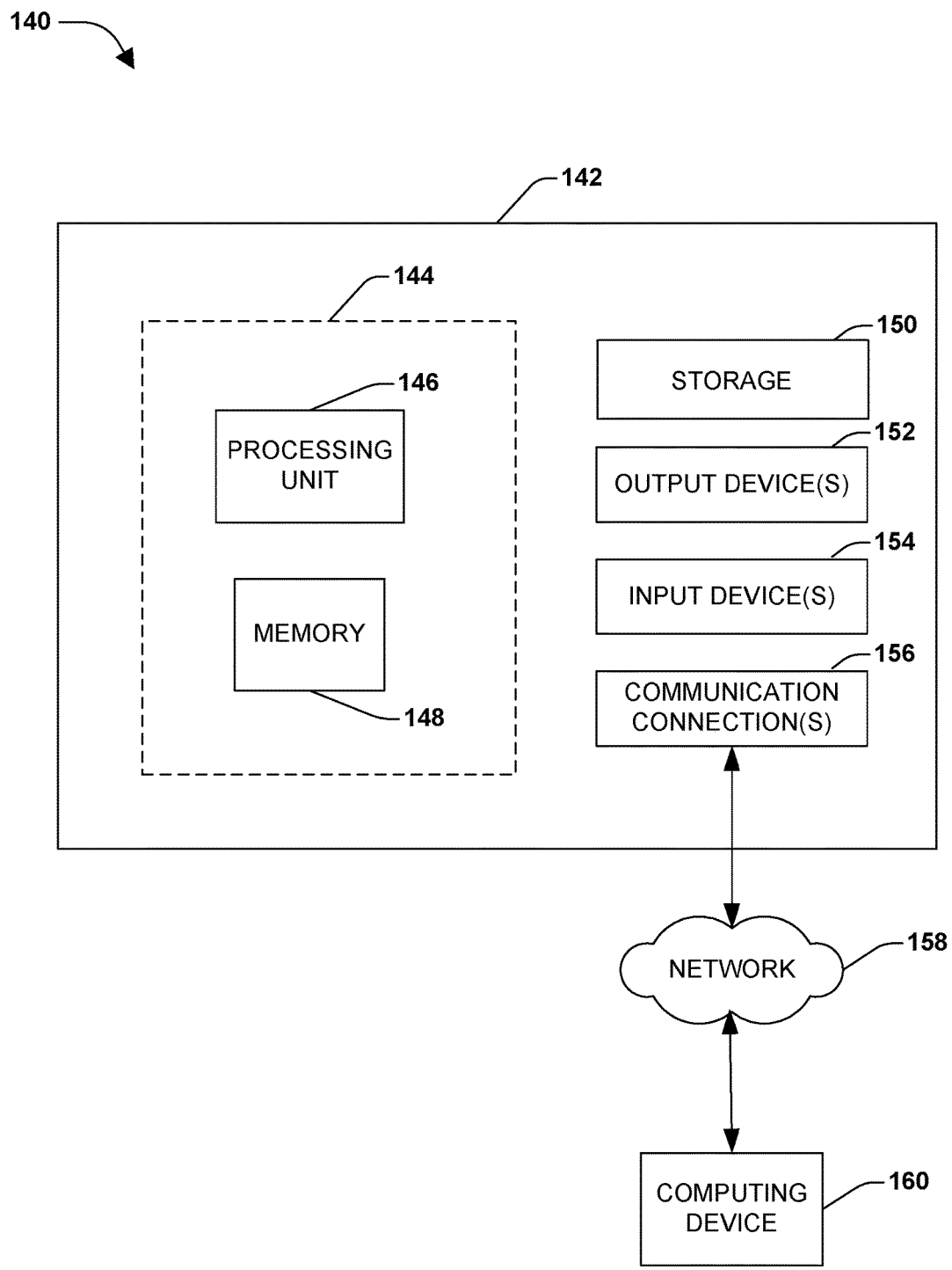
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 8 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 8 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method performed on a client device interconnected to one or more additional client devices via a computer network, the client device having a synchronization service operable to synchronize, via the computer network, multiple objects in an object set with corresponding object sets on the additional client devices, the method comprising:
   receiving, via the computer network, a notification that an object for the object set is created on another client device;
   in response to receiving the notification, creating an object descriptor associated with a local copy of the object referenced in the received notification, the object descriptor containing information regarding a synchronization state of the local copy of the object in the object set at the client device;
   during synchronization of the object,
      determining the synchronization status of the local copy of the object on the client device, the synchronization status including data indicating one of requesting synchronization of the object, receiving a copy of the object at the client device, relocating a received copy of the object from a temporary location to a file location on the client device, or a version conflict is detected for the received copy of the object at the client device; and
      upon determining the synchronization status, updating a value of the object descriptor with the determined synchronization status; and
   presenting, upon request, to a user the value of the object descriptor associated with the local copy of the object on the client device, thereby informing the user a potential reason why the local copy of the object is not currently available on the client device.

2. The method of claim 1, further comprising:
   in response to receiving the notification,
      transmitting, via the computer network, a request for a copy of the object; and
      receiving, via the computer network, a copy of the object transmitted in response to the request.

3. The method of claim 1 wherein determining the synchronization status further includes:
   determining whether the local copy of the object exists in the file location on the client device; and
   in response to determining that the local copy of the object exists in the file location on the client device, updating the value of the object descriptor to indicate that the local copy of the object is now available on the client device.

4. The method of claim 1 wherein determining the synchronization status further includes:
   determining whether a portion of the object has been received at the client device; and
   in response to determining that a portion of the object has been received at the client device, updating the value of the object descriptor to indicate that the copy of the object is currently being received.

5. The method of claim 1 wherein determining the synchronization status further includes:
   determining whether the copy of the object has been received at the client device but has not been relocated to the file location on the client device; and
   in response to determining that a copy of the object has been received at the client device but has not been relocated to the file location on the client device, updating the value of the object descriptor to indicate that the copy of the object is currently being relocated from the temporary location to the file location.

6. The method of claim 1 wherein determining the synchronization status further includes:
   determining whether the copy of the object has been received at the client device;
   in response to determining that the copy of the object has been received at the client device, determining whether a version conflict exists between the received copy of the object in the temporary location and another object in the file location; and
   in response to determining that a version conflict exists between the received copy of the object in the temporary location and the another object in the file location, updating the value of the object descriptor to indicate that the received copy of the object is locked due to the determined version conflict.

7. The method of claim 6, further comprising:
   receiving, via an input component of the client device, a user input to resolve the version conflict associated with the object; and
   in response to the received user input, resolving the version conflict based on the user input and updating the value of the object descriptor associated with the local copy of the object.

8. A computing device interconnected to one or more additional computing devices via a computer network, the computing device comprising:
   a processor; and
   a memory containing a local object set synchronized with remote object sets on the one or more additional computing devices, the memory also containing instructions executable by the processor to cause the computing device to:
      receive, via the computer network, a notification that an object is created in a remote object set on another computing device;
      in response to receiving the notification, create or receive an object descriptor associated with a local copy of the object referenced in the received notification and store the object descriptor in the memory of the computing device, the object descriptor containing data representing a synchronization state of the local copy of the object in the local object set at the computing device; and
      during synchronization of the object,
         monitor for a change in the synchronization status of the local copy of the object on the computing device, the synchronization status including data indicating one of requesting synchronization of the object, receiving a copy of the object at the computing device, relocating a received copy of the object from a temporary location to a file location on the computing device, or a version conflict is detected for the received copy of the object at the computing device; and
         upon detecting a change in the synchronization status, update a value of the object descriptor in the memory in accordance with the detected change in the synchronization status.

9. The computing device of claim 8 wherein the memory also include instructions executable by the processor to cause the computing device to:
receive, from a user, a request for a current value of the object descriptor associated with the local copy of the object; and
in response to receiving the request, present to the user the value currently contained in the object descriptor associated with the local copy of the object on the computing device, thereby informing the user a potential reason why the local copy of the object is not currently available on the computing device.

10. The computing device of claim 8 wherein to monitor for the change in the synchronization status includes:
determining whether the local copy of the object is accessible in the file location; and
in response to determining that the local copy of the object is accessible in the file location, update the value of the object descriptor to a new value indicating that the local copy of the object is available for access on the computing device.

11. The computing device of claim 8 wherein to monitor for the change in the synchronization status includes:
determine whether a portion of the object has been received at the computing device; and
in response to determining that a portion of the object has been received at the computing device, update the value of the object descriptor to a new value indicating that a copy of the object is currently being received.

12. The computing device of claim 8 wherein to monitor for the change in the synchronization status includes:
determine whether a copy of the object has been received at the computing device but has not been relocated to the file location on the computing device; and
in response to determining that a copy of the object has been received at the computing device but has not been relocated to the file location on the computing device, updating the value of the object descriptor to a new value indicating that a copy of the object is currently being relocated to the local object set as the local copy of the object.

13. The computing device of claim 8 wherein to monitor for the change in the synchronization status includes:
determining whether a copy of the object has been received at the computing device;
in response to determining that a copy of the object has been received at the computing device, determining whether a version conflict exists between the received copy of the object and another object in the local object set; and
in response to determining that a version conflict exists between the received copy of the object and the another object in the local object set, updating the value of the object descriptor to a new value indicating that the received copy of the object is currently locked due to the determined version conflict.

14. The computing device of claim 13, further comprising:
receiving, via an input component of the computing device, a user input to resolve the version conflict associated with the object; and
in response to the received user input, resolving the version conflict based on the user input and updating the value of the object descriptor associated with the local copy of the object.

15. A method performed on a client device interconnected to one or more other client devices via a computer network, the client device having a synchronization service operable to synchronize multiple objects in a local object set with corresponding objects in the other client devices via the computer network, the method comprising:
receiving, via the computer network, a notification that an object is created in a remote object set on another client device;
in response to receiving the notification, creating an object descriptor associated with a local copy of the object and storing the created object descriptor in a memory on the client device, the object descriptor containing data representing a synchronization state of the local copy of the object in the local object set;
during synchronization of the local object set,
detecting a version conflict between a received copy of the object at the client device and another object in the local object set on the client device; and
updating a value of the object descriptor in the memory of the client device to indicate the detected version conflict; and
upon request, outputting, to a user, data indicating that the received copy of the object is not available at the client device due to the detected version conflict based on the value of the object descriptor associated with the received copy of the object on the client device.

16. The method of claim 15, further comprising:
determining whether a copy of the object is available in the another client device; and
in response to determining that a copy of the object is not available on the another client device, updating the value of the object descriptor in the memory of the client device with a new value indicating that the object is lost.

17. The method of claim 15, further comprising:
determining whether the another client device is reachable on the computer network; and
in response to determining that the another client device is not reachable on the computer network, updating the value of the object descriptor in the memory of the client device with a new value indicating that a connection issue exists for synchronization of the local object set with the remote object set on the another client device.

18. The method of claim 15 wherein updating the value of the object descriptor includes subsequent to creating and storing the object descriptor, updating the value of the object descriptor in the memory of the client device with a new value indicating the object is being searched.

19. The method of claim 15, further comprising:
in response to receiving the notification, transmitting, via the computer network, a request for a copy of the object from the another client device; and
wherein updating the value of the object descriptor includes subsequent to transmitting the request for a copy of the object from the another client device, updating the object descriptor with another new value indicating the object is being requested.

20. The method of claim 15, further comprising;
subsequent to transmitting the request for a copy of the object from the another client device, determining whether a portion of the object has been received at the client device; and in response to determining that a portion of the object has been received at the client device, updating the object descriptor with yet another new value indicating the object is being received.

* * * * *